(12) United States Patent
Rothschild et al.

(10) Patent No.: US 10,477,260 B2
(45) Date of Patent: Nov. 12, 2019

(54) NETWORK BASED DIGITAL VIDEO RECORDER PLAYBACK ADAPTER

(71) Applicant: COX COMMUNICATIONS, INC., Atlanta, GA (US)

(72) Inventors: Keith Alan Rothschild, Atlanta, GA (US); Robert Lee Ames, Jr., Atlanta, GA (US); Ronald Larry Hardzog, Jr., Atlanta, GA (US); Muhammad Asif Raza, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 14/517,352

(22) Filed: Oct. 17, 2014

(65) Prior Publication Data
US 2016/0112739 A1    Apr. 21, 2016

(51) Int. Cl.
| | |
|---|---|
| H04N 21/231 | (2011.01) |
| H04N 21/235 | (2011.01) |
| H04N 21/24 | (2011.01) |
| H04N 21/262 | (2011.01) |
| H04N 21/438 | (2011.01) |
| H04N 21/442 | (2011.01) |
| H04N 21/647 | (2011.01) |
| H04N 21/2665 | (2011.01) |
| H04N 21/2343 | (2011.01) |
| H04N 21/239 | (2011.01) |

(Continued)

(52) U.S. Cl.
CPC ..... *H04N 21/2665* (2013.01); *H04N 21/2343* (2013.01); *H04N 21/2387* (2013.01); *H04N 21/2393* (2013.01); *H04N 21/23103* (2013.01); *H04N 21/23439* (2013.01); *H04N 21/2541* (2013.01); *H04N 21/2747* (2013.01); *H04N 21/4622* (2013.01); *H04N 21/64322* (2013.01); *H04N 21/64738* (2013.01); *H04N 21/8456* (2013.01)

(58) Field of Classification Search
None
See application file for complete search history.

(56) References Cited

U.S. PATENT DOCUMENTS

| | | |
|---|---|---|
| 5,581,479 A | 12/1996 | McLaughlin et al. |
| 6,119,154 A | 9/2000 | Weaver et al. |
| (Continued) | | |

FOREIGN PATENT DOCUMENTS

| | | |
|---|---|---|
| EP | 2003838 | 12/2008 |

*Primary Examiner* — Brian T Pendleton
*Assistant Examiner* — Jean D Saint Cyr
(74) *Attorney, Agent, or Firm* — Eversheds Sutherland (US) LLP

(57) ABSTRACT

This disclosure describes systems and methods related to a network-based digital video recorder playback adapter. In some embodiments, a request for digital content may be received from a customer device. A plurality of segments associated with the digital content may be received. A content stream may be generated based at least in part on the plurality of segments associated with the digital content. The content stream may be transmitted. Additionally, load balancing may be implemented to optimally select a source of digital content. Additional load balancing may further be performed at a customer premises between multiple communicative connections to provide requested content to the client device.

21 Claims, 7 Drawing Sheets

(51) Int. Cl.
  *H04N 21/2747* (2011.01)
  *H04N 21/462* (2011.01)
  *H04N 21/643* (2011.01)
  *H04N 21/2387* (2011.01)
  *H04N 21/254* (2011.01)
  *H04N 21/845* (2011.01)

(56) References Cited

U.S. PATENT DOCUMENTS

| | | | |
|---|---|---|---|
| 6,816,904 | B1 | 11/2004 | Ludwig et al. |
| 7,707,308 | B1* | 4/2010 | Hogge, Jr. ............ H04L 51/38 |
| | | | 709/218 |
| 7,812,854 | B1 | 10/2010 | Delker et al. |
| 8,552,975 | B2 | 10/2013 | Junh |
| 8,566,461 | B1 | 10/2013 | Jun et al. |
| 8,677,406 | B2 | 3/2014 | Berkoff |
| 8,683,060 | B2 | 3/2014 | Meketa |
| 8,806,659 | B1 | 8/2014 | Miazzo |
| 8,893,194 | B2 | 11/2014 | Baumgartner et al. |
| 8,990,911 | B2 | 3/2015 | Olden |
| 9,009,763 | B2 | 4/2015 | Rothschild et al. |
| 9,032,497 | B2 | 5/2015 | Padala |
| 9,100,709 | B1* | 8/2015 | Osminer ............ H04N 21/4622 |
| 9,398,339 | B2 | 7/2016 | Lee |
| 2002/0013948 | A1 | 1/2002 | Aguayo et al. |
| 2002/0174430 | A1 | 11/2002 | Ellis et al. |
| 2002/0184637 | A1 | 12/2002 | Perlman |
| 2003/0097564 | A1 | 5/2003 | Tewari et al. |
| 2003/0182429 | A1 | 9/2003 | Jagels |
| 2003/0208763 | A1 | 11/2003 | McElhatten et al. |
| 2004/0162787 | A1 | 8/2004 | Madison et al. |
| 2005/0005114 | A1 | 1/2005 | Medvinsky |
| 2005/0022242 | A1 | 1/2005 | Rosetti et al. |
| 2005/0183120 | A1 | 8/2005 | Jain et al. |
| 2006/0080703 | A1 | 4/2006 | Compton |
| 2006/0085821 | A9 | 4/2006 | Simmons et al. |
| 2006/0203001 | A1 | 9/2006 | Van Der Stok |
| 2007/0104456 | A1 | 5/2007 | Craner |
| 2007/0124781 | A1 | 5/2007 | Casey et al. |
| 2007/0226767 | A1 | 9/2007 | Kaminski et al. |
| 2007/0250920 | A1 | 10/2007 | Lindsay |
| 2008/0022331 | A1 | 1/2008 | Barrett |
| 2008/0031276 | A1 | 2/2008 | Hsu |
| 2008/0046930 | A1 | 2/2008 | Smith et al. |
| 2008/0077942 | A1 | 3/2008 | MacMillan et al. |
| 2008/0086569 | A1* | 4/2008 | Arora ............ H04L 12/2801 |
| | | | 709/231 |
| 2008/0250101 | A1 | 10/2008 | Tanaka |
| 2008/0306871 | A1 | 12/2008 | Grannan |
| 2009/0119716 | A1 | 5/2009 | Ellis |
| 2009/0144765 | A1 | 6/2009 | Branam |
| 2009/0169179 | A1 | 7/2009 | Johnson |
| 2009/0217326 | A1* | 8/2009 | Hasek ............ H04N 7/17336 |
| | | | 725/87 |
| 2009/0222853 | A1 | 9/2009 | White et al. |
| 2009/0300673 | A1 | 12/2009 | Bachet |
| 2010/0017828 | A1* | 1/2010 | Xiong ............ H04N 7/17318 |
| | | | 725/93 |
| 2010/0036965 | A1 | 2/2010 | Kim et al. |
| 2010/0040345 | A1 | 2/2010 | Beach et al. |
| 2010/0086277 | A1 | 4/2010 | Craner |
| 2010/0162367 | A1 | 6/2010 | LaJoie et al. |
| 2010/0220976 | A1 | 9/2010 | Ellis et al. |
| 2010/0250773 | A1 | 9/2010 | Mao |
| 2010/0313257 | A1 | 12/2010 | Padinjareveetil |
| 2010/0319044 | A1 | 12/2010 | Agans et al. |
| 2011/0016014 | A1 | 1/2011 | Tonnison et al. |
| 2011/0016307 | A1 | 1/2011 | Killian |
| 2011/0040850 | A1 | 2/2011 | Moromisato et al. |
| 2011/0052157 | A1 | 3/2011 | Pickelsimer et al. |
| 2011/0143654 | A1* | 6/2011 | Mukhija ............ H04B 7/18513 |
| | | | 455/9 |
| 2011/0247084 | A1 | 10/2011 | Kolbert et al. |
| 2011/0249658 | A1 | 10/2011 | Wohlert et al. |
| 2011/0276993 | A1 | 11/2011 | Ferguson |
| 2011/0307548 | A1 | 12/2011 | Fisk |
| 2011/0321100 | A1 | 12/2011 | Tofighbakhsh |
| 2012/0008912 | A1 | 1/2012 | Stevens |
| 2012/0030721 | A1 | 2/2012 | Smith et al. |
| 2012/0131629 | A1 | 5/2012 | Shrum |
| 2012/0159146 | A1 | 6/2012 | Kamieniecki et al. |
| 2012/0180082 | A1 | 7/2012 | Rothschild et al. |
| 2012/0210382 | A1 | 8/2012 | Walker et al. |
| 2012/0254456 | A1* | 10/2012 | Visharam ............ H04N 21/2343 |
| | | | 709/231 |
| 2012/0266201 | A1 | 10/2012 | Kanojia et al. |
| 2012/0275597 | A1 | 11/2012 | Knox |
| 2012/0284802 | A1 | 11/2012 | Hierro et al. |
| 2012/0291104 | A1 | 11/2012 | Hasek |
| 2012/0315021 | A1 | 12/2012 | Schwesinger et al. |
| 2013/0007240 | A1 | 1/2013 | Qiu et al. |
| 2013/0046849 | A1* | 2/2013 | Wolf ............ H04L 67/2842 |
| | | | 709/217 |
| 2013/0064525 | A1 | 3/2013 | Cary et al. |
| 2013/0114940 | A1 | 5/2013 | Merzon et al. |
| 2013/0145410 | A1 | 6/2013 | Major et al. |
| 2013/0191884 | A1 | 7/2013 | Leicher |
| 2013/0227615 | A1 | 8/2013 | Bryant et al. |
| 2013/0269020 | A1 | 10/2013 | Griffin et al. |
| 2013/0275545 | A1 | 10/2013 | Baptist et al. |
| 2013/0315567 | A1 | 11/2013 | Narayanan et al. |
| 2013/0326572 | A1 | 12/2013 | Pitts |
| 2014/0020021 | A1* | 1/2014 | Liu ............ H04N 21/4383 |
| | | | 725/39 |
| 2014/0037270 | A1 | 2/2014 | Graner |
| 2014/0040660 | A1 | 2/2014 | Gladwin et al. |
| 2014/0082679 | A1 | 3/2014 | Chan et al. |
| 2014/0089995 | A1 | 3/2014 | Hasek |
| 2014/0101708 | A1 | 4/2014 | Bradley |
| 2014/0115724 | A1 | 4/2014 | van Brandenburg et al. |
| 2014/0181519 | A1 | 6/2014 | Rao |
| 2014/0189761 | A1 | 7/2014 | Sood et al. |
| 2014/0215018 | A1 | 7/2014 | Lam |
| 2014/0219638 | A1 | 8/2014 | Viveganandhan et al. |
| 2014/0237505 | A1 | 8/2014 | Rothschild et al. |
| 2014/0237520 | A1 | 8/2014 | Rothschild et al. |
| 2014/0237521 | A1 | 8/2014 | Rothschild et al. |
| 2014/0237522 | A1 | 8/2014 | Rothschild et al. |
| 2014/0237525 | A1 | 8/2014 | Rothschild et al. |
| 2014/0250471 | A1* | 9/2014 | Guerra ............ H04N 21/43615 |
| | | | 725/82 |
| 2014/0282918 | A1 | 9/2014 | Rothschild et al. |
| 2014/0282982 | A1 | 9/2014 | Rothschild et al. |
| 2014/0298441 | A1 | 10/2014 | Yamaguchi |
| 2014/0325221 | A1 | 10/2014 | Rothschild et al. |
| 2015/0009991 | A1* | 1/2015 | Sung ............ H04L 12/4641 |
| | | | 370/392 |
| 2015/0012995 | A1 | 1/2015 | Korat |

\* cited by examiner

NETWORK BASED DIGITAL VIDEO RECORDER PLAYBACK ADAPTER

TECHNICAL FIELD

Aspects of the disclosure are related generally to digital video recorder functionality, and more particularly to a network-based digital video recording playback adapter.

BACKGROUND

Broadband service providers, such as cable service providers and satellite service providers, typically communicate broadband signals and/or other signals to customers in order to provide a wide variety of services, such as television service, telephone service, Internet service, etc. In conventional systems, a signal is communicated from a service provider to a set-top box ("STB") situated within a customer's household. The signal is then processed by the STB in order to format data for presentation to the customer. Additionally, many conventional systems utilize digital video recorders ("DVRs") to facilitate the recording of broadband content at the customer's direction. Conventional DVRs are typically situated within the customer's household. Conventional STBs and/or DVRs may not be compatible with digital content delivery network systems.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

This disclosure relates to, among other things, systems, methods, computer-readable media, techniques, and methodology for a network-based digital video recording playback adapter. In some embodiments, a content delivery network may provide network-based digital video recording, where content may be stored for a user in a cloud service and retrieved upon request by a user. Such a system may provide a user with access to increased storage without having to upgrade hardware in their homes. However, in many cases, such updated network-based digital content delivery networks may not be compatible with older customer premise devices. A network-based digital video recording playback adapter may allow a user continued user of their customer premise device by receiving a request for digital content, retrieving segments associated with the digital content, generating a content stream based on the segments associated with the digital content, and transmitting the content stream to the customer premise device.

Various illustrative embodiments have been discussed above. These and other example embodiments of the disclosure will be described in more detail hereinafter through reference to the accompanying drawings. The drawings and the corresponding description are provided merely for illustration and are not intended to limit the disclosure in any way. It should be appreciated that numerous other embodiments, variations, and so forth are within the scope of this disclosure.

Illustrative Use Cases and System Architecture

Figure 1:
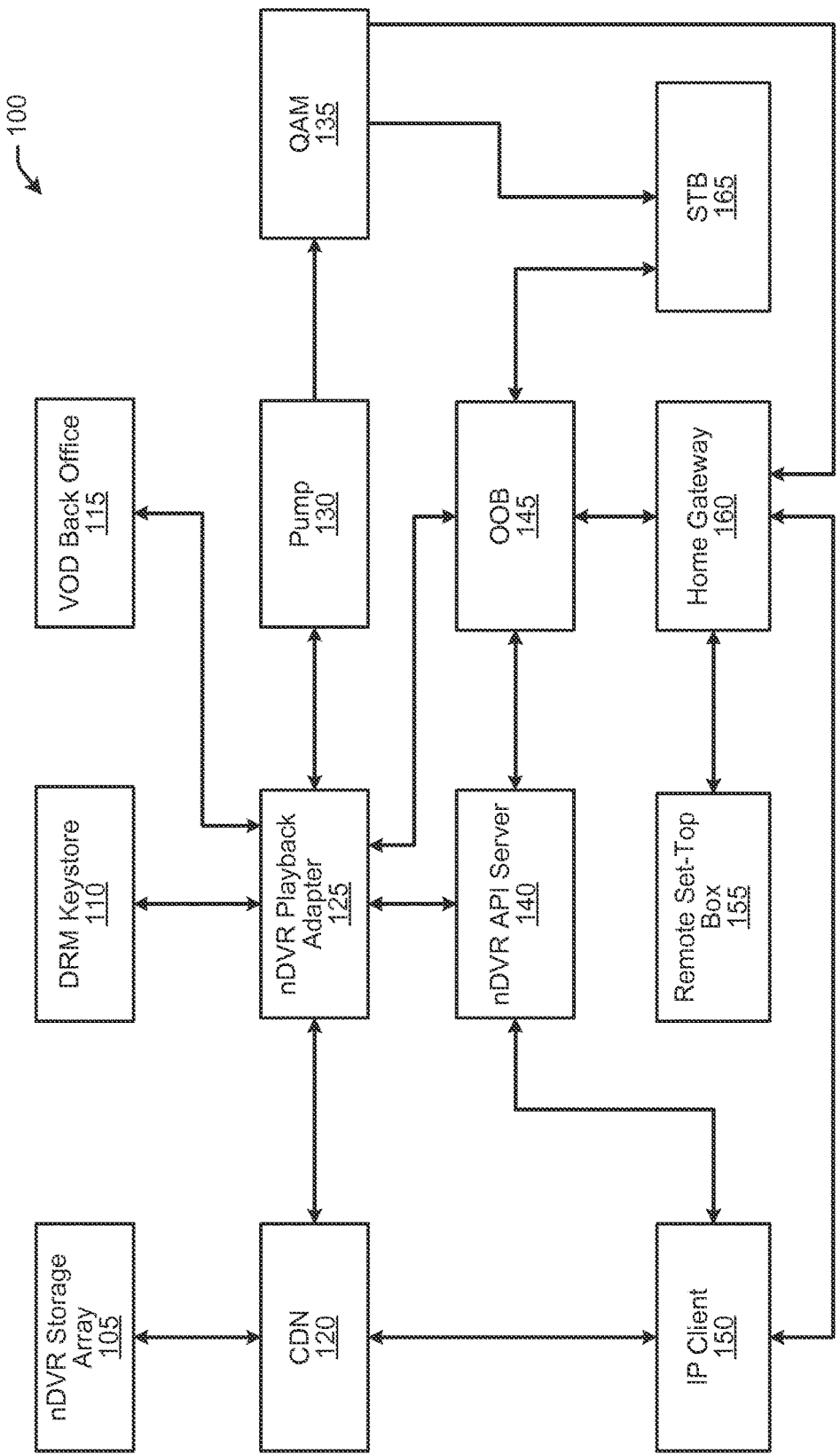
FIG. 1 is a block diagram including various hardware and software components of a system for a network-based digital video recorder playback adapter, in accordance with one or more example embodiments of the disclosure.

FIG. 1 is a block diagram including various hardware and software components of a system for a network-based digital video recorder playback adapter in accordance with one or more embodiments of the disclosure. In some embodiments, the system may include one or more nDVR storage array(s) 105, one or more digital rights management (DRM) keystore(s) 110, one or more video on demand (VOD) back office server(s) 115, one or more content delivery network (CDN) server(s) 120, one or more nDVR playback adapter(s) 125, one or more pump(s) 130, one or more quadrature amplitude modulation (QAM) device(s) 135, one or more nDVR API server(s) 140, one or more out of band (OOB) device(s) 145, one or more IP client(s) 150, one or more remote set-top boxes 155, one or more home gateway(s) 160, and/or one or more set top boxes 165.

In an illustrative example, a legacy set top box (STB) 165 may be incompatible to receive digital content directly from a digital content delivery network service provided by a service provider via one or more CDN server(s) 120. In some embodiments, a STB 165 may be in communication with a home gateway device 160. The home gateway device 160 may provide a local area network (LAN) within a pre-defined space, such as a residence. The home gateway 160 may request and receive digital content and distribute the content to one or more devices connected to the LAN (e.g., remote set top box 155, IP client 150, and/or STB 165). In some embodiments, the home gateway 160 may serve as a load balancing mechanism by receiving requests for content from the various devices connected to the LAN and determining where each device should obtain the requested digital content (e.g., directly from a CDN 120 or via a QAM device 135).

The nDVR API server 140 may generate and maintain information associated with content accessible by users associated with a user account. For example, the nDVR API server 140 may identify a user account associated with one or more customer premise devices (e.g., STB 165, home gateway 160, remote STB 155, and/or IP client(s) 150). The nDVR API server 140 may determine that the user account has access to digital content based at least in part on a subscription or service type associated with the user account. For example, the user account may be associated with a basic cable package and have 100 gigabytes of storage available to store digital content. In some embodiments, the nDVR API server 140 may generate a listing of live content available to the customer premise devices based at least in part the user account and may manage and maintain storage of digital content on one or more remote servers in association with the user account. In some embodiments, the nDVR API server 140 may receive requests from one or more IP clients 150 associated with a user account. The nDVR API server 140 may transmit lists of available content, either via a subscription associated with the user account and/or digital content stored in association with the user account to an IP client 150, a home gateway 160, and/or a STB 165.

In some embodiments, the legacy STB 165 may receive a listing of digital content available via the digital content delivery network from an nDVR API server 140 through the OOB device 145. In some embodiments, the STB 165 and/or home gateway 160 may generate requests to communicate with an nDVR API server 140 and/or an nDVR playback adapter 125 to request digital content. In some embodiments, the requests are received by an OOB device 145 and processed prior to being transmitted to their intended destinations. In some embodiments, the OOB device 145 processes the requests to ensure the message is compatible with the destination devices.

In some embodiments, the nDVR playback adapter 125 may receive a request for content. The request may originate from a home gateway 160 or a STB 165. In some embodiments, the request for digital content may be a network uniform resource locator (URL).

The nDVR playback adapter 125, based at least in part on the request, may communicate with one or more CDN server(s) 120 to retrieve the requested digital content. In some embodiments, the CDN server(s) 120 may retrieve the plurality of segments associated with the digital content based at least in part on the network URL of the request. The CDN 120 may communicate with one or more nDVR storage arrays 105 to obtain a plurality of segments associated with the digital content. The CDN 120 may package the segments to transmit to the nDVR playback adapter 125.

In some embodiments, the nDVR playback adapter 125 may receive and process the packaged segments from the CDN 120. The nDVR playback adapter 125 may obtain one or more keys from a DRM keystore 110. The nDVR playback adapter 125 may decrypt or unencrypt the processed segments based at least in part on the keys obtained from the DRM keystore 110.

The nDVR playback adapter 125 may communicate with one or more VOD back office server(s) 115 to identify one or more resources (e.g., pumps 130 and/or QAM devices 135) available to further process the requested digital content. The nDVR playback adapter 125 may receive information associated with available resources within the network for further processing the digital content.

The nDVR playback adapter 125 may generate a digital content stream based at least in part on the plurality of segments. The nDVR playback adapter 125 may decrypt, trans-encapsulate, enrich, and/or concatenate the plurality of segments to generate the digital content stream and transmit the content stream to one or more pumps 130. The pump may process the content stream received from the nDVR playback adapter 125 to facilitates encoding the content stream and equalize the stream. The pump may transmit the processed stream to the QAM device 135. The QAM device may receive the processed content stream and modulate and encrypt. The content stream may then be transmitted to requesting device (e.g., STB 165 and/or home gateway 160).

The STB may receive the content stream from the QAM 135 and display the content stream to a user. In some embodiments, the STB may request 165 that one or more trick modes be applied to the content stream. The STB 165 may generate a request to the nDVR playback adapter 125 with regards to the trick modes. In some embodiments, the nDVR playback adapter 125 may have generated data associated with trick modes during the generation of the content stream. The nDVR playback adapter 125 may receive the request associated with the trick modes and may make modifications to the content stream prior to transmitting the content stream to the pump 130.

In some embodiments, the IP client 150 may be in communication with the home gateway 160 and may request digital content via the home gateway 160. In some embodiments, the IP client 150 may access the content delivery network from a different network based at least in part on its association with a user account and may access content directly from one or more CDN server(s) 120 or via the nDVR API server 140.

In some example embodiments, the home gateway 160, the nDVR API server 140, CDN 120 may be configured to cooperate with one or more other elements of architecture 100, such as IP client 150, STB 165, and/or remote STB 155 to load balance the source of content (e.g., IP source from the CDN 120 or QAM source 135) and load balance the distribution of the content within the customer premise (e.g. via multimedia over cable (MoCA), Ethernet, or WiFi). Load balancing may be performed to provide a path for content delivery to the client device 150, 155, 165 that may provide a relatively high bandwidth and/or relatively low latency. In example embodiments where an adaptive bit rate (ABR) streaming mechanism may be utilized for delivery of content to the client device 150, 155, 165, a relatively high bandwidth and/or relatively low latency may enable the delivery of relatively high quality video content with relatively low delay, resulting in relatively high user satisfaction. Additionally, on the multi-operator system (MSO) side, load balancing (e.g., QAM vs. IP) may enable a greater and/or more efficient utilization of assets (e.g., content delivery assets such as communications links and/or servers) for the delivery of content to users via their client devices 150, 155, 165. This may result, particularly over a long term, a greater return on investment (ROI) of the content delivery assets. On the premises side, load balancing may provide for relatively reduced delays in the delivery of content and relatively lower disruption to other client devices at the premises that may be sharing bandwidth with the client device to which content is to be delivered.

Those of ordinary skill in the art will appreciate that the illustrative architecture 100 depicted in FIG. 1 is provided by way of example only. Numerous other operating environments, system architectures, and device configurations are within the scope of this disclosure. Other embodiments of the disclosure may include fewer or greater numbers of components and/or devices and may incorporate some or all of the functionality described with respect to the illustrative architecture 100 depicted in FIG. 1, or additional functionality.

Figure 2:
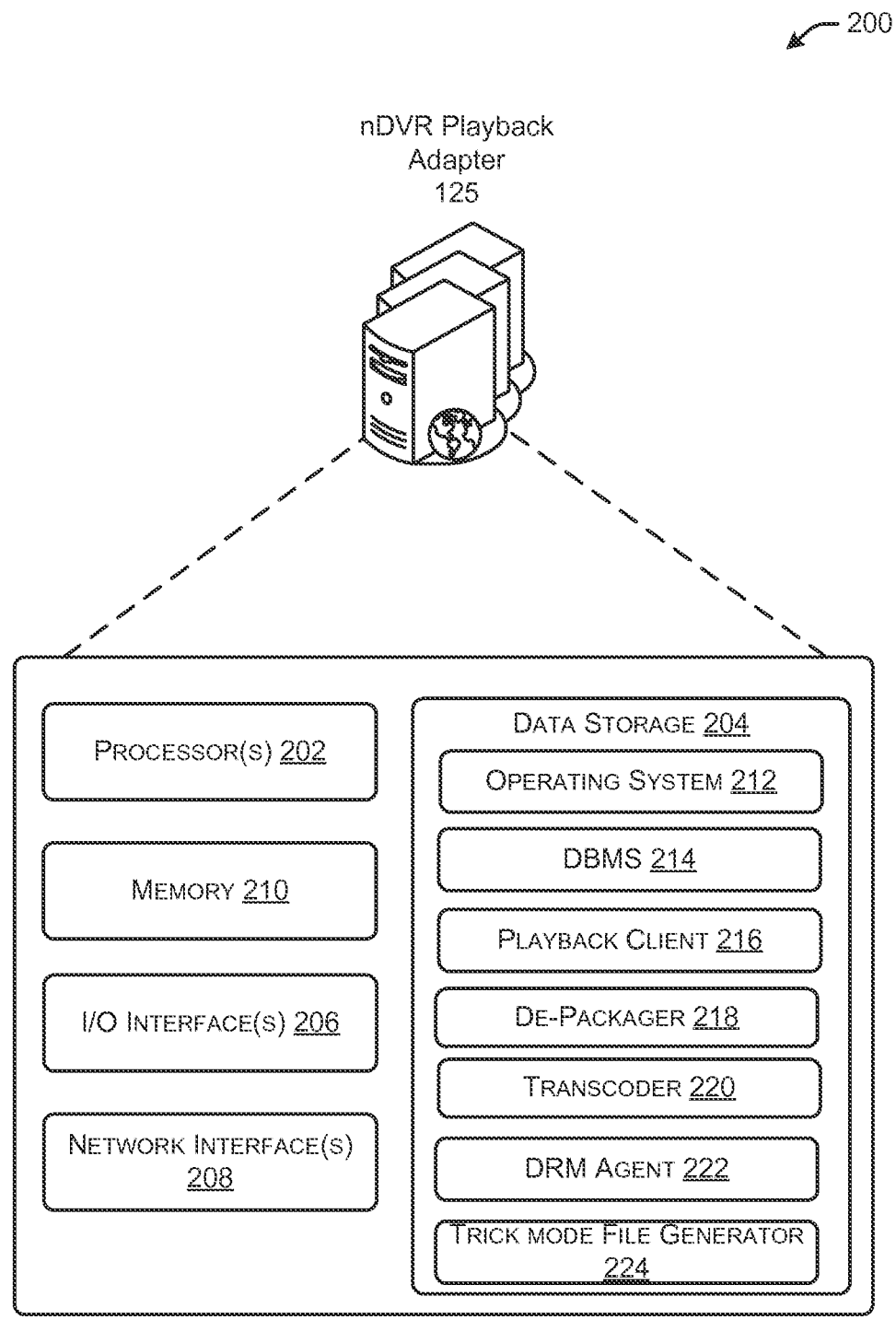
FIG. 2 is a block diagram of illustrative components of an nDVR playback adapter, in accordance with one or more example embodiments of the disclosure.

FIG. 2 is a block diagram of illustrative components of an nDVR playback adapter 125 in accordance with one or more embodiments of the disclosure. The illustrative system architecture 200 may include one or more processors (processor(s)) 202 and one or more memories 210 (referred to herein generically as memory 210). The processor(s) 202 may include any suitable processing unit capable of accepting digital data as input, processing the input data based on stored computer-executable instructions, and generating output data. The computer-executable instructions may be stored, for example, in the data storage 204 and may include, among other things, operating system software and application software. The computer-executable instructions may be retrieved from the data storage 204 and loaded into the memory 210 as needed for execution. The processor(s) 202 may be configured to execute the computer-executable instructions to cause various operations to be performed. The processor(s) 202 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 204 may store program instructions that are loadable and executable by the processor(s) 202, as well as data manipulated and generated by the processor(s) 202 during execution of the program instructions. The program instructions may be loaded into the memory 210 as needed for execution. Depending on the configuration and implementation of the nDVR playback adapter(s) 125, the memory 210 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 210 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The nDVR playback adapter(s) 125 may further include additional data storage 204 such as removable storage and/or non-removable storage including, but not limited to, magnetic storage, optical disk storage, and/or tape storage. Data storage 204 may provide non-volatile storage of computer-executable instructions and other data. The memory 210 and/or the data storage 204, removable and/or non-removable, are examples of computer-readable storage media (CRSM).

The nDVR playback adapter(s) 125 may further include network interface(s) 208 that facilitate communication between the nDVR playback adapter(s) 125 and other devices of the illustrative system architecture 100 or application software via the network(s). The nDVR playback adapter(s) 125 may additionally include one or more input/output (I/O) interfaces 206 (and optionally associated software components such as device drivers) that may support interaction between a user and a variety of I/O devices, such as a keyboard, a mouse, a pen, a pointing device, a voice input device, a touch input device, a display, speakers, a camera, a microphone, a printer, and so forth.

Referring again to the data storage 204, various program modules, applications, or the like may be stored therein that may comprise computer-executable instructions that when executed by the processor(s) 202 cause various operations to be performed. The memory 210 may have loaded from the data storage 204 one or more operating systems (O/S) 212 that may provide an interface between other application software (e.g., dedicated applications, a browser application, a web-based application, a distributed client-server application, etc.) executing on the nDVR playback adapter(s) 125 and the hardware resources of the nDVR playback adapter(s) 125. More specifically, the O/S 212 may include a set of computer-executable instructions for managing the hardware resources of the nDVR playback adapter(s) 125 and for providing common services to other application programs (e.g., managing memory allocation among various application programs). The O/S 212 may include any operating system now known or which may be developed in the future including, but not limited to, any mobile operating system, desktop or laptop operating system, mainframe operating system, or any other proprietary or open-source operating system.

The data storage 204 may further include one or more database management systems (DBMS) 214 for accessing, retrieving, storing, and/or manipulating data stored in one or more datastores. The DBMS 214 may use any of a variety of database models (e.g., relational model, object model, etc.) and may support any of a variety of query languages.

The data storage 204 may additionally include various other program modules that may include computer-executable instructions for supporting a variety of associated functionality. For example, the data storage 204 may include one or more playback client(s) 216, one or more de-packager(s) 218, one or more transcoders(s) 220, one or more DRM agent(s) 222, and/or one or more trick mode file generator(s) 224.

The playback client(s) 216 may include computer-executable instructions that in response to execution by the processor(s) 202 cause operations to be performed including receiving a request for digital content from a legacy device, such as a set top box 165, and/or retrieving or otherwise obtaining files containing or associated with the requested digital content from one or more CDN server(s) 120 and/or nDVR API server(s) 140. The de-packager(s) 218 may include computer-executable instructions that in response to execution by the processor(s) 202 cause operations to be performed including receiving the digital content from the playback client 216 and de-packaging or unzipping the digital content from the retrieved files.

The transcoder (s) 220 may include computer-executable instructions that in response to execution by the processor(s) 202 cause operations to be performed including receiving the unpackaged digital content from the de-packager 218 and transcoding the digital content.

The DRM agent(s) 222 may include computer-executable instructions that in response to execution by the processor(s) 202 cause operations to be performed including retrieving one or more keys from a DRM keystore 110 and decrypting the digital content received from the transcoder based at least in part on the one or more keys retrieved from the DRM keystore 110.

The trick mode file generator(s) 224 may include computer-executable instructions that in response to execution by the processor(s) 202 cause operations to be performed including generating data associated with one or more trick modes based at least in part on the digital content. For example, the trick mode file generator 224 may generate frames to be used for trick modes, such as fast forward or rewind, of the digital content.

Within the data storage 204, one or more modules may be stored. As used herein, the term module may refer to a functional collection of instructions that may be executed by the one or more processor(s) 202. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

While various program modules (e.g., software modules) have been depicted and described with respect to various illustrative components of the architecture 200, it should be appreciated that the functionality described as being supported by the program modules may be enabled by any combination of hardware, software, and/or firmware.

It should further be appreciated that each of the above-mentioned modules may, in various embodiments, represent a logical partitioning of supported functionality. This logical partitioning is depicted for ease of explanation of the functionality and may not be representative of the structure of hardware, software, or firmware for implementing the functionality. Accordingly, it should be appreciated that the functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Further, while certain modules may be depicted and described as sub-modules of another module, in certain embodiments, such modules may be provided as independent modules.

While various program modules (e.g., software modules) have been depicted and described with respect to various illustrative components of the architecture 200, it should be appreciated that the functionality described as being supported by the program modules may be enabled by any combination of hardware, software, and/or firmware.

It should further be appreciated that each of the above-mentioned modules may, in various embodiments, represent a logical partitioning of supported functionality. This logical partitioning is depicted for ease of explanation of the functionality and may not be representative of the structure of hardware, software, or firmware for implementing the functionality. Accordingly, it should be appreciated that the functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Further, while certain modules may be depicted and described as sub-modules of another module, in certain embodiments, such modules may be provided as independent modules.

Figure 3:
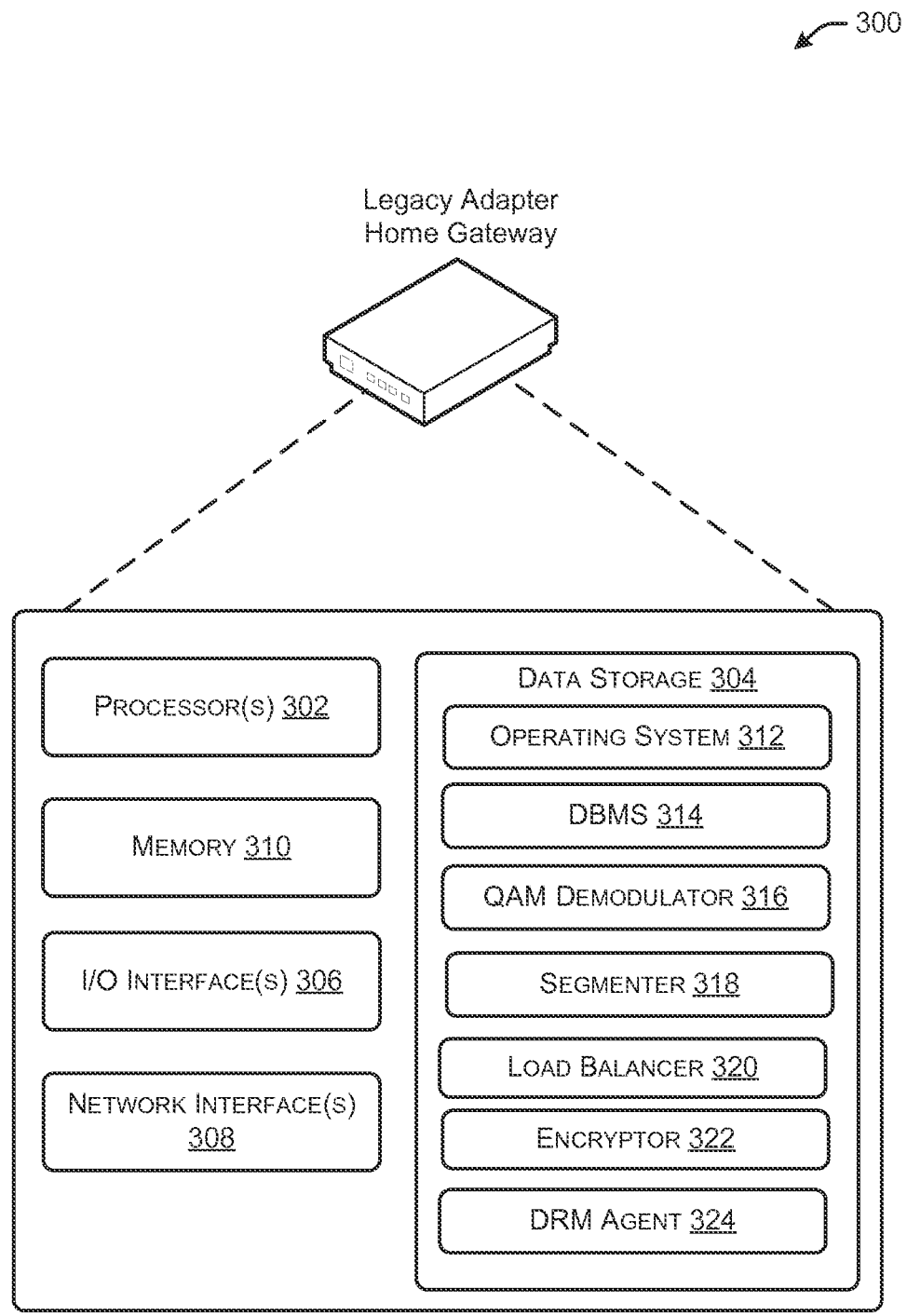
FIG. 3 is a block diagram of illustrative components of a legacy adapter home gateway, in accordance with one or more example embodiments of the disclosure.

FIG. 3 is a block diagram of illustrative components of a legacy adapter home gateway 160 in accordance with one or more embodiments of the disclosure. The illustrative system architecture 300 may include one or more processors (processor(s)) 302 and one or more memories 310 (referred to herein generically as memory 310). The processor(s) 302 may include any suitable processing unit capable of accepting digital data as input, processing the input data based on stored computer-executable instructions, and generating output data. The computer-executable instructions may be stored, for example, in the data storage 304 and may include, among other things, operating system software and application software. The computer-executable instructions may be retrieved from the data storage 304 and loaded into the memory 310 as needed for execution. The processor(s) 302 may be configured to execute the computer-executable instructions to cause various operations to be performed. The processor(s) 302 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 304 may store program instructions that are loadable and executable by the processor(s) 302, as well as data manipulated and generated by the processor(s) 302 during execution of the program instructions. The program instructions may be loaded into the memory 310 as needed for execution. Depending on the configuration and implementation of the legacy adapter home gateway 160, the memory 310 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 310 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The legacy adapter home gateway 160 may further include additional data storage 304 such as removable storage and/or non-removable storage including, but not limited to, magnetic storage, optical disk storage, and/or tape storage. Data storage 304 may provide non-volatile storage of computer-executable instructions and other data. The memory 310 and/or the data storage 304, removable and/or non-removable, are examples of computer-readable storage media (CRSM).

The legacy adapter home gateway 160 may further include network interface(s) 308 that facilitate communication between the legacy adapter home gateway 160 and other devices of the illustrative system architecture 100 or application software via the network(s). The legacy adapter home gateway 160 may additionally include one or more input/output (I/O) interfaces 306 (and optionally associated software components such as device drivers) that may support interaction between a user and a variety of I/O devices, such as a keyboard, a mouse, a pen, a pointing device, a voice input device, a touch input device, a display, speakers, a camera, a microphone, a printer, and so forth.

Referring again to the data storage 304, various program modules, applications, or the like may be stored therein that may comprise computer-executable instructions that when executed by the processor(s) 302 cause various operations to be performed. The memory 310 may have loaded from the data storage 304 one or more operating systems (O/S) 312 that may provide an interface between other application software (e.g., dedicated applications, a browser application, a web-based application, a distributed client-server application, etc.) executing on the legacy adapter home gateway 160 and the hardware resources of the legacy adapter home gateway 160. More specifically, the O/S 312 may include a set of computer-executable instructions for managing the hardware resources of the legacy adapter home gateway 160 and for providing common services to other application programs (e.g., managing memory allocation among various application programs). The O/S 312 may include any operating system now known or which may be developed in the future including, but not limited to, any mobile operating system, desktop or laptop operating system, mainframe operating system, or any other proprietary or open-source operating system.

The data storage 304 may further include one or more database management systems (DBMS) 314 for accessing, retrieving, storing, and/or manipulating data stored in one or more datastores. The DBMS 314 may use any of a variety of database models (e.g., relational model, object model, etc.) and may support any of a variety of query languages.

The data storage 304 may additionally include various other program modules that may include computer-executable instructions for supporting a variety of associated functionality. For example, the data storage 304 may include one or more QAM demodulators 316, one or more segmenter(s) 318, one or more load balancer(s) 320, one or more encryptor(s) 322, and/or one or more DRM agent(s) 324.

The QAM demodulator(s) 316 may include computer-executable instructions that in response to execution by the processor(s) 302 cause operations to be performed including receiving one or more content streams from QAM 135 and demodulating the one or content streams.

The segmenter(s) 318 may include computer-executable instructions that in response to execution by the processor(s) 302 cause operations to be performed including receiving one or more content streams from QAM demodulator 316 and segmenting the content stream into a plurality of segments.

The one or more load balancer(s) 320 may include computer-executable instructions that in response to execution by the processor(s) 302 cause operations to be performed including analyzing the one or more active connections from one or more IP clients 150, remote set-top boxes 155, and/or set top boxes 165 and their respective content requests. Based at least in part on the type of content requested and current bandwidth status, the load balancer 320 may direct each of the devices to retrieve the digital content from the CDN 120 and/or from the nDVR playback adapter 125. In other words, the processor(s) 302 may be configured to identify one or more metrics associated with communications link(s) it has with other entities. Based at least in part on these metrics, the processor(s) 302 may be configured to determine and/or select entities from which it may receive and/or solicit content that may be requested by a user. For example, if a user requests a particular content from his/her STB 165, the home gateway 160 may be configured, in example embodiments, to consider a variety of network and/or communications link metric(s) to determine if the content is to be delivered to the STB 165 from the QAM source 135 or from the CDN 120. Indeed, the home gateway may consider a variety of metric(s) pertaining to the bandwidth load and latency of various communications links, as well as the bandwidth and latency requirements for the content that is to be provided at the premises (e.g., to the STB 165 or IP Client 150).

The processor(s) 302 may, in example embodiments, be configured to identify content that may be requested by a user via his/her user device, such as his/her STB 165, remote STB 155, and/or IP client 150. The processor(s) may further be configured to identify that the content may be available via either the QAM source 135 or the CDN 120. At this point, the home gateway 160 and the processor(s) 302 thereon, may be configured to engage in load balancing between the QAM source 135 and the CDN 120. In performing the load balancing process, the processor(s) 302 may be configured, in example embodiments, to identify one or more metric(s) associated with the connection between the content requesting client device 165, 155, 150 and the QAM source 135 and the CDN 120. In example embodiments, the home gateway 160 may be configured to identify available bandwidth and latency of the communications link between the content requesting client device 165, 155, 150 and the QAM source 135. Additionally, the home gateway 160 may be configured to identify the available bandwidth and latency of the communications link between the content requesting client device 165, 155, 150 and the CDN 120. In example embodiments, the home gateway 160 may be configured to receive the metric(s), such as available bandwidth, latency, capacity loading, estimated uptime, available burst capacity (e.g., temporary over-modulated bandwidth), or the like, from one or more suitable sources, such as the CDN 120, the QAM source 135, and/or any other entity of the architecture 100. In some cases, the home gateway may be configured to solicit the value of the metric(s) associated with connection with the CDN 120 and/or the QAM source 135 from the element that measures and/or is the repository of up-to-date values of these metric(s). In other example embodiments, the home gateway 160 and the processor(s) 302 thereon may be configured to measure the metric(s) that may be used for assessing whether the content is to be provided to the requesting client device 165, 155, 150 via the QAM source 135 or the CDN 120. Regardless, of how the metric(s) are acquired, at this point, upon receiving the metric values, the home gateway 160 may be configured to make an assessment of whether the requested content should be sourced from the CDN 120 or the QAM source 135.

In another example embodiment, the home gateway 160 and the processor(s) 302 thereon, by executing instructions stored at least in the load balancer module 320, may be configured to receive and/or intercept a request for content that may originate from one or more of the IP client 150, the STB 165, the remote STB 155, and/or any suitable device configured to request content from the architecture 100 and the multisystem operator(s) (MSO(s)) associated therewith. This request for content may identify content that is being requested by a user of the requesting device (e.g., IP client 150), such as by title of the content, an alpha-numerical identifier, entertainment identifier registry (EIDR), and/or indeed any suitable identifier of content. The request may further include one or more values of metric(s) associated with the IP client's connection with the CDN 120 and with the home gateway 160. The metric(s) may include an indication of available bandwidth and/or the latency of various communications links. In example embodiments, the request may include metric(s) associated with a communicative link between the client device 150, 155, 165 and the CDN 120 (e.g., Data Over Cable Service Interface Specification (DOCSIS)), as well as one or more communicative links with the home gateway 160 (e.g., MoCA, Ethernet, WiFi, etc.).

The home gateway 160 and the processor(s) 302 thereon, by executing instructions stored at least in the load balancer module 320, may be configured to analyze the metric(s) associated with each of the communicative links between the client device 150, 155, 165 and either the CDN 120 and/or the home gateway 160. The analysis may result in selecting a mechanism for delivering the content to the client device 150, 155, 165. The mechanism, in example embodiments, may be for the client device 150, 155, 165 to receive the content directly from the CDN 120 or from the home gateway 160. If the content is to be received from the CDN 120, the protocol for receiving the content by the client device 150, 155, 165 may be IP. In this case, the client device 150, 155, 165 may receive a playlist or manifest file to receive segments of the content directly from the CDN 120, in accordance with the playlist and content segment locations provided therein. On the other hand, if the content is to be received by the home gateway 160 and then further sent to the requesting client device 150, 155, 165, then the home gateway 160 and the processor(s) 302 thereon may further be configured to transencode the received content from any other protocol/modulation scheme (e.g., QAM) to a streaming IP signal. In this case, the home gateway 160 and the processor(s) 302 thereon may further be configured to select an on-premises mechanism (e.g., MoCA, Ethernet, WiFi, etc.) for delivery of the content (e.g., streaming content) to the client device 150, 155, 165.

The one or more encryptor(s) 322 may include computer-executable instructions that in response to execution by the processor(s) 302 cause operations to be performed including receive the plurality of segments from the segmenter 318 and encrypt the digital content (e.g., plurality of segments) prior to transmitting the requested digital content to an IP client 150 and/or a remote set-top box 155.

The DRM agent(s) 324 may include computer-executable instructions that in response to execution by the processor(s) 302 cause operations to be performed including decrypting content received from the CDN 120 via an IP client 150 using one or more keys retrieved from the DRM keystore 110 or locally stored on the home gateway 160.

Within the data storage 304, one or more modules may be stored. As used herein, the term module may refer to a functional collection of instructions that may be executed by the one or more processor(s) 302. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

While various program modules (e.g., software modules) have been depicted and described with respect to various illustrative components of the architecture 300, it should be appreciated that the functionality described as being supported by the program modules may be enabled by any combination of hardware, software, and/or firmware.

It should further be appreciated that each of the above-mentioned modules may, in various embodiments, represent a logical partitioning of supported functionality. This logical partitioning is depicted for ease of explanation of the functionality and may not be representative of the structure of hardware, software, or firmware for implementing the functionality. Accordingly, it should be appreciated that the functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Further, while certain modules may be depicted and described as sub-modules of another module, in certain embodiments, such modules may be provided as independent modules.

While various program modules (e.g., software modules) have been depicted and described with respect to various illustrative components of the architecture 300, it should be appreciated that the functionality described as being supported by the program modules may be enabled by any combination of hardware, software, and/or firmware.

It should further be appreciated that each of the above-mentioned modules may, in various embodiments, represent a logical partitioning of supported functionality. This logical partitioning is depicted for ease of explanation of the functionality and may not be representative of the structure of hardware, software, or firmware for implementing the functionality. Accordingly, it should be appreciated that the functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Further, while certain modules may be depicted and described as sub-modules of another module, in certain embodiments, such modules may be provided as independent modules.

Illustrative Processes

Figure 4:
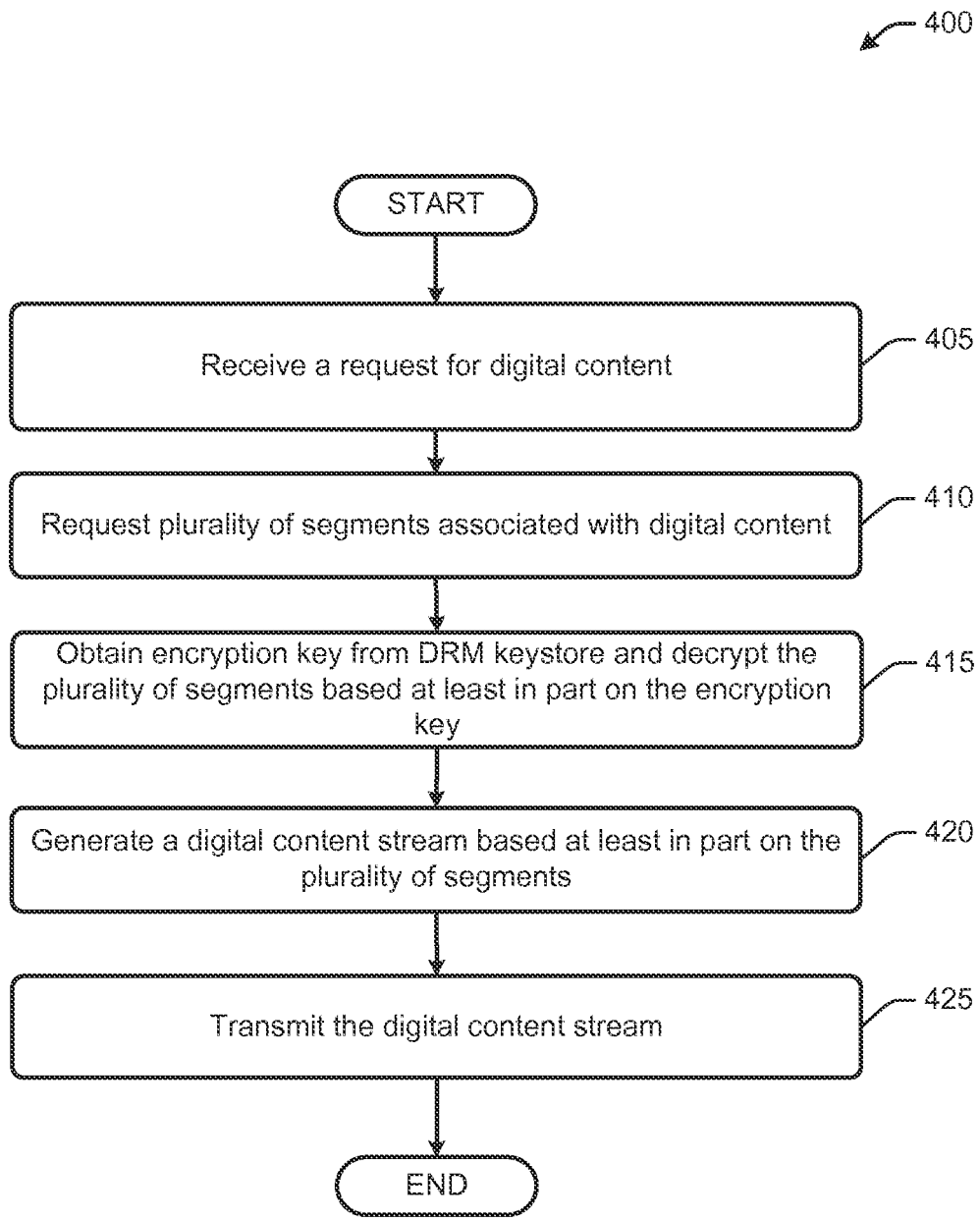
FIG. 4 is a process flow diagram of an illustrative method for processing digital content in a system for a network-based digital video recorder playback adapter, in accordance with one or more example embodiments of the disclosure.

FIG. 4 is a process flow diagram of an illustrative method 400 for processing digital content in a system for a network-based digital video recorder playback adapter in accordance with one or more embodiments of the disclosure. At block 405, the nDVR playback adapter 125 may receive a request for digital content. In some embodiments, the request may originate from a legacy set top box 165. The request may travel, via the OOB 145 module to the nDVR playback adapter 125. In some embodiment, the request for digital content may original from a home gateway device 160 on behalf of one or more additional devices, such as the remote set-top box 155 and/or one or more IP clients 150. The nDVR playback adapter 125 may receive a request for digital content from an nDVR API server 140 on behalf of one or more devices, such as an IP client 150, a home gateway device 160, and/or a legacy set top box 165.

At block 410, the nDVR playback adapter 125 may request a plurality of segments associated with the digital content. In some embodiments, the playback client 216 may request a plurality of segments associated with the requested digital content from one or more CDN servers 120. The CDN servers 120 may retrieve the requested segments associated with the digital content from one or more nDVR storage array devices 105 and transmit the segments to the nDVR playback adapter 125. In some embodiments, the de-packager(s) 218 may de-package and/or unzip the digital content from the data (e.g., received segments) from the nDVR playback adapter.

At block 415, the nDVR playback adapter 125 may obtain an encryption key from a DRM keystore and decrypt the plurality of segments based at least in part on the encryption key. In some embodiments, the DRM agent 222 of the nDVR playback adapter may determine whether it possesses the required encryption key in local storage of the nDVR playback adapter 125. If the DRM agent 222 determines the encryption key is not located in the nDVR playback adapter, the DRM agent 222 may identify and establish a communication with an appropriate DRM keystore 110. The DRM agent 222 may request an encryption key based at least in part on information associated with the requested digital content. The DRM agent 222 may receive or otherwise obtain one or more encryption key or similar authentication tool associated with the requested digital content. The DRM agent 22 may then decrypt and/or unencrypt the plurality of segments received from the CDN server 120. In some embodiments, the plurality of segments received from the CDN server 120 may require multiple levels of decryption and/or unencryption using multiple encryption keys and/or different authentication tools.

At block 420, the nDVR playback adapter 125 may generate a digital content stream based at least in part on the decrypted plurality of segments. In some embodiments, the transcoder (s) 220 may transcoding the digital content stream prior to transmitting the stream to the pump 130.

At block 425, the nDVR playback adapter 125 may transmit the digital content stream. In some embodiments, the nDVR playback adapter 125 may transmit the digital content stream to the pump 130. In some embodiments, the nDVR playback adapter 125 may transmit the digital content stream to an nDVR API server 140.

In some embodiments, the trick mode file generator(s) 224 may generate data associated with one or more trick modes based at least in part on the digital content. The generated data may be transmitted with the digital content stream. In some embodiments, the generated data associated with the digital content may be generated and maintained by the nDVR playback adapter 125 and used when requests are received from one or more legacy devices (e.g., STB 165) to effectuate one or more trick modes in association with the digital content.

Figure 5:
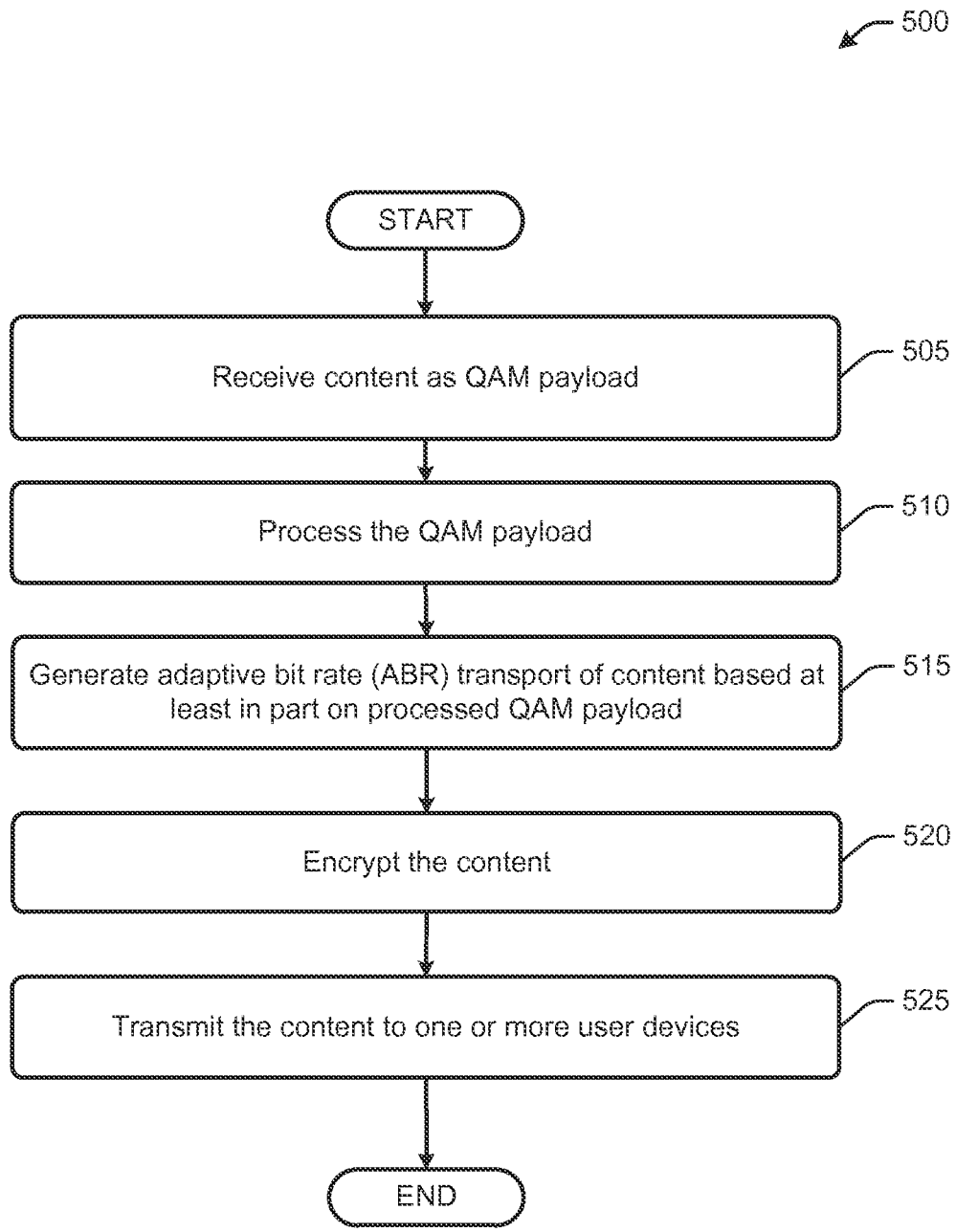
FIG. 5 is a process flow diagram of an illustrative method for processing QAM content in a system for a network-based digital video recorder playback adapter, in accordance with one or more example embodiments of the disclosure.

FIG. 5 is a process flow diagram of an illustrative method 500 for processing QAM content in a system for a network-based digital video recorder playback adapter in accordance with one or more embodiments of the disclosure. At block 505, the legacy adapter home gateway 160 may receive content as QAM payload. In some embodiments, the QAM payload may be received from the QAM 135 module. For example, the home gateway 160 may receive the digital content stream via the pump 130 as described in relation to FIG. 4.

At block 510, the legacy adapter home gateway 160 may process the QAM payload. In some embodiments, the QAM demodulator 316 may process the QAM payload to extract or otherwise obtain the requested digital content from the QAM payload. The segmenter 318 may receive the demodulated digital content from the QAM demodulator 316 and segment or otherwise divide the digital content stream into a plurality of smaller files.

At block 515, the legacy adapter home gateway 160 may generate adaptive bit rate (ABR) transport of content based at least in part on the processed QAM payload. In some embodiments, the home gateway 160 may generate an ABR transport of content based at least in part on the encrypted plurality of segments derived from the digital content stream.

At block 520, the legacy adapter home gateway 160 may encrypt the content. In some embodiments, the encryptor 322 may encrypt the one or more plurality of segments from the segmenter 318 using an authentication tool, such as an encryption key obtained by the DRM agent 324 from a DRM keystore 110.

At block 525, the legacy adapter home gateway 160 may transmit the content to one or more user devices. In some embodiments, the home gateway 160 may transmit the content to one or more IP clients 150, remote set top boxes 155, and/or a set top box 165.

Figure 6:
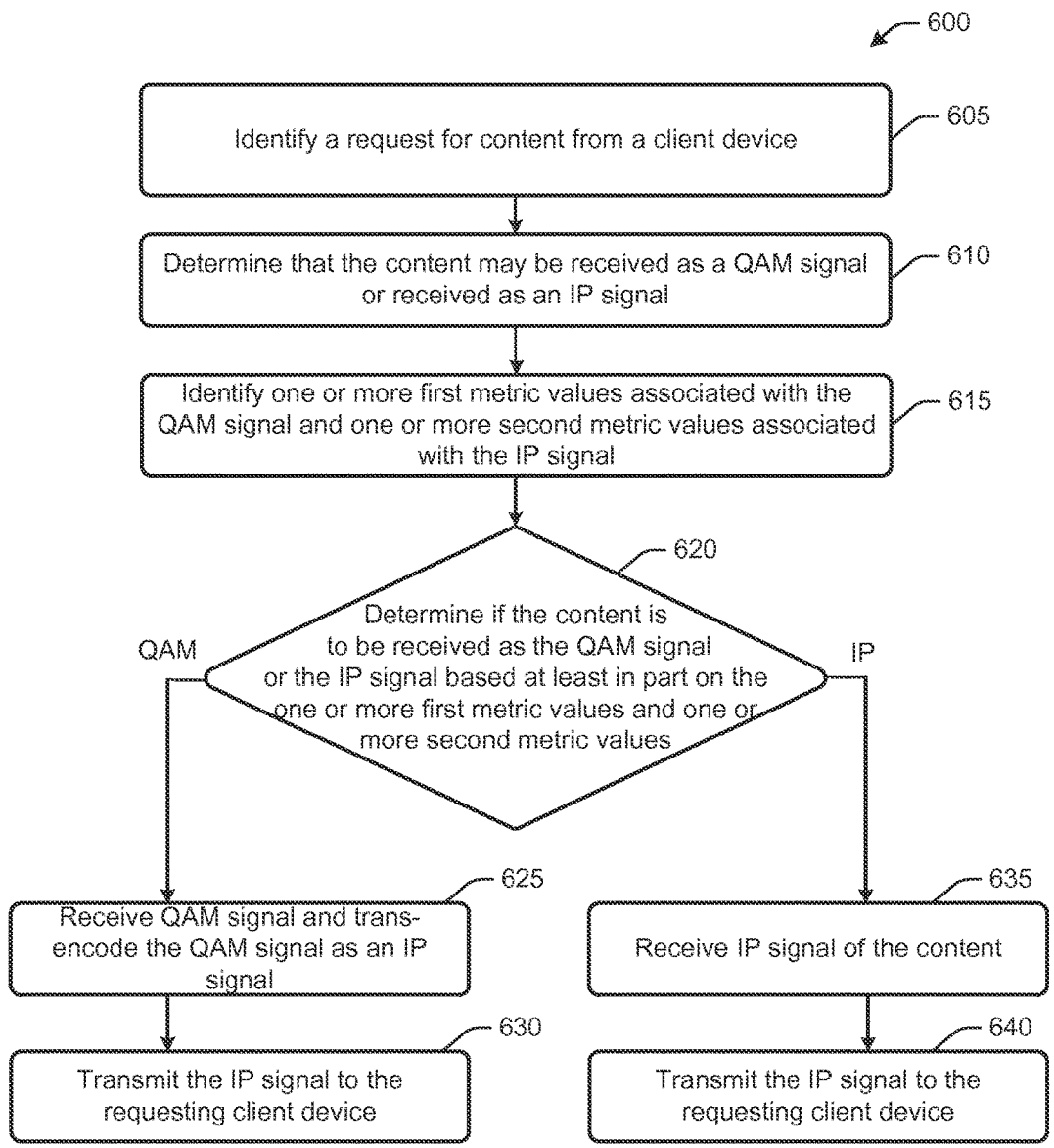
FIG. 6 is a process flow diagram of an illustrative method for load-balancing between two different sources of content, in accordance with one or more example embodiments of the disclosure.

FIG. 6 is a process flow diagram of an illustrative method 600 for load-balancing between two different sources of content, in accordance with one or more example embodiments of the disclosure. This method 600, in example embodiments, may be performed by the home gateway 160 and the processor(s) 302 thereon, in cooperation with one or more other elements of the architecture 100. At block 605, a request for content from a client device may be identified. This request may, in example embodiments be directed to the home gateway 160.

At block 610, it may be determined that the content may be received as a QAM signal or as an IP signal. The home gateway may interact with the QAM source 135, the CDN 120, and/or the VOD back office 115 to make this determination. In example embodiments, the home gateway 160 may solicit this information by interacting with elements, such as the CDN 120 and the QAM source 135 that may provide the content.

At block 615, one or more first metric values associated with the QAM signal and one or more second metric values associated with the IP signal may be identified. These metric(s) may include, for example, a measure of bandwidth and/or latency, or projections thereof, associated with each of the QAM and/or IP sources of content.

At block 620, it may be determined if the content is to be received as the QAM signal or as the IP signal, based at least in part on the one or more first and second metric values. This determination, in example embodiments, may be made such that user experience is enhanced by using a mechanism or communicative pathway that provides the greatest bandwidth and/or the lowest latency. Alternatively, a mechanism or communicative pathway may be selected such that the architecture 100 is able to provide a high quality of service across a collection of users that may be requesting content. In this case, load may be balanced to provide a consistently high quality of content transmission (e.g., high-definition ABR, low latency, etc.) or to ensure a high uptime (e.g., low probability of failure of elements of the architecture 100 in delivering content).

If it is determined at block 620 that the content is to be delivered via QAM, then at block 620, the QAM signal may be received and trans-encoded as a streaming IP signal. At block 630, the trans-encoded IP signal may be transmitted (e.g., streamed) to the content requesting client device. It will be appreciated that trans-encoding the QAM signal to appear as an IP signal may be optional. Indeed, if the client device is the STB 165, the QAM signal may be received by the STB 165 from the QAM source 135 and demodulated at the STB 165.

If, however, it is determined at block 620 that the content is to be delivered via IP, then at block 635, the IP signal may be received and at block 640, the IP signal may be transmitted to the content requesting client device. In alternative example embodiments, the client device 150 may receive the content directly from the source (e.g., the CDN 120).

Figure 7:
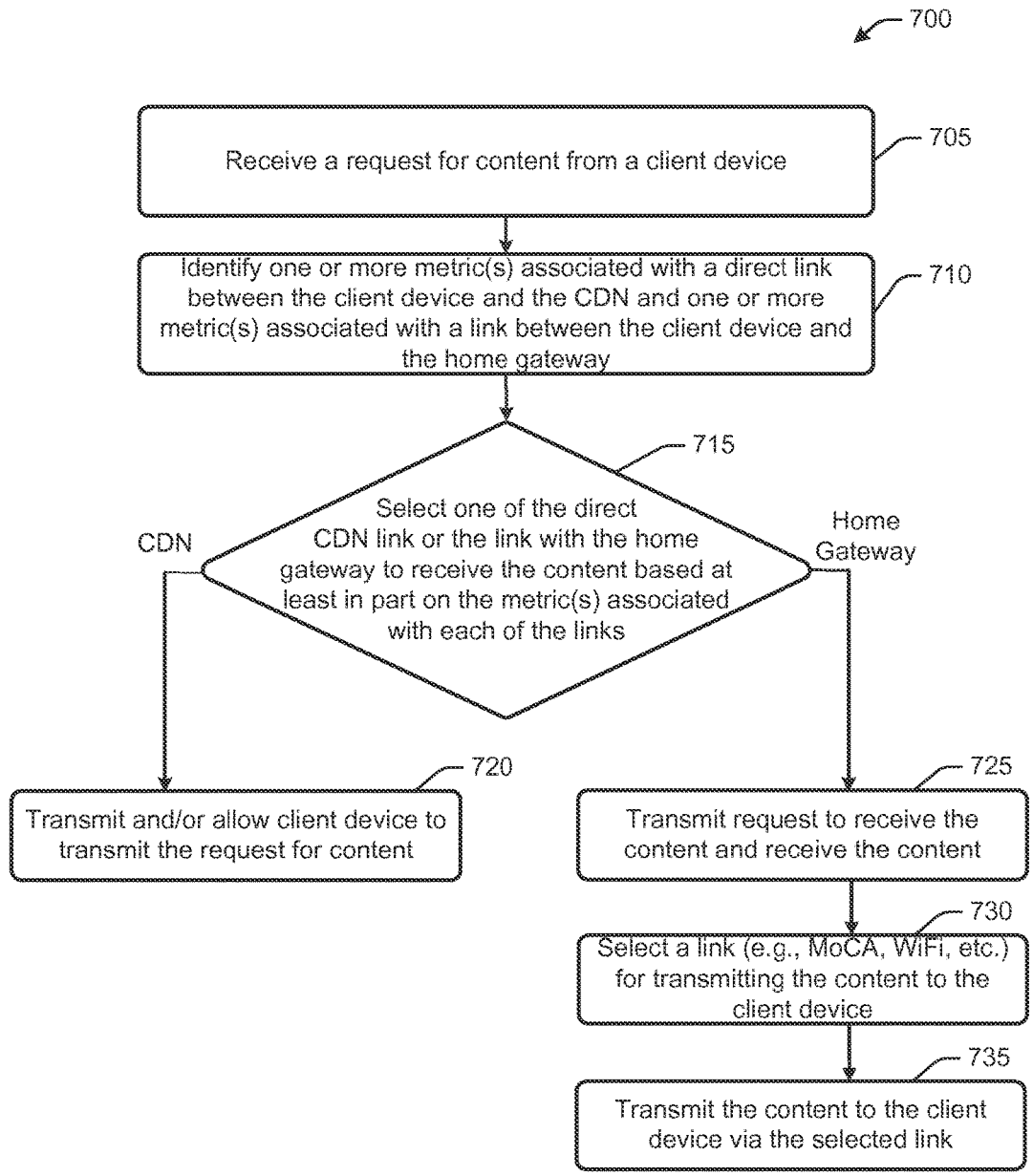
FIG. 7 is a process flow diagram of an illustrative method for load-balancing between sources of content and/or among various communicative links for delivery of content via the home gateway, in accordance with one or more example embodiments of the disclosure.

FIG. 7 is a process flow diagram of an illustrative method 700 for load-balancing between sources of content and/or among various communicative links for delivery of content via the home gateway, in accordance with one or more example embodiments of the disclosure. This method 700, in example embodiments, may be performed by the home gateway 160 and the processor(s) 302 thereon, in cooperation with one or more other elements of the architecture 100. Alternatively, the nDVR API 140 may perform the processes of method 700.

At block 705, a request for content from a client device may be received. This request may, in example embodiments, be intercepted by the home gateway 160. This interception may be during the transmission of the request from the client device 150 to the CDN 120. In some cases, the home gateway 160 may be in the transit path between the client device 150 and the CDN 120 and, therefore, may be able to intercept the request. The home gateway 160 may perform one or more analysis on the data packets of the content request from the client device 150 to identify the content request, such as a deep packet inspection (DPI) of data packets that may be suspected of being a content request originating from the client device 150 to the CDN 120.

At block 710, one or more metric values associated with a direct link between the client device and the CDN and one or more metric values associated with a link between the client device and the home gateway may be identified. These metric(s) may include, for example, a measure of bandwidth and/or latency, or projections thereof, associated with each of the communicative links associated with the client device 150. In example embodiments, the client device 150 may have one or more links to the home gateway 160, such as a MoCA link, Ethernet link, and/or WiFi link, for which it may provide metric value(s), such as a suitable measure of available bandwidth, latency, uplink transmission time, downlink transmission time, or the like.

At block 715, it may be determined if the content is to be received directly from the CDN as a streaming IP signal of from the home gateway, based at least in part on the metric values associated with the communicative links between the client device and the CDN and/or any of the various communicative links available between the client device and the home gateway. This determination, in example embodiments, may be made such that user experience is enhanced by using a mechanism or communicative pathway that provides the greatest bandwidth and/or the lowest latency for delivery of content to the client device 150 for rendering to a user. Alternatively, a mechanism or communicative pathway may be selected such that the architecture 100 is able to provide a high quality of service across a collection of users that may be requesting content. In this case, load may be balanced to provide a consistently high quality of content transmission (e.g., high-definition ABR, low latency, etc.) or to ensure a high uptime (e.g., low probability of failure of elements of the architecture 100 in delivering content).

If it is determined at block 715 that the content is to be delivered directly from the CDN 150 to the client device, then at block 720 the request for content may be sent or allowed to be sent from the client device 150 to the CDN 120. In example embodiments, the home gateway 160 may serve as a conduit to transmit the request from the client device 150. In other example embodiments, the client device 150 may transmit the content request via any other suitable communicative pathway. The client device 150, upon requesting the content, may be provided with a playlist or manifest file containing addresses or locations of segments of the content that the client device 150 is to receive. Using the playlist, the client device 150 may retrieve segments from the CDN 120 (e.g., have the content streamed) for rendering to a user requesting the content via the client device 150.

If, however, it is determined at block 715 that the content is to be provided to the client device 150 via the home gateway, then at block 725, the home gateway may identify the requested content and transmit a request to receive the content. This request may be sent to any suitable entity that may be able to provide the requested content, such as, for example the QAM source 135 or the CDN 120. Responsive to transmitting the request for content, the home gateway 160 may receive the content from the entity to which the request was made.

At block 730, a link may be selected based at least in part on the metric value(s) associated with various links between the client device 150 and the home gateway 160 for transmitting the content to the client device 150. The link may be selected from, for example a MoCA, WiFi, or Ethernet link between the client device 150 and home gateway 160. This link may be selected based at least in part on the metric value(s) associated with each of these links. In example embodiments, the particular link may be selected to provide a relatively high quality of user experience. In this case, a link may be selected where a high bandwidth, low latency, and/or high uptime connection may be available between the client device 150 and the home gateway 160. In other example embodiments, a link may be selected so that the operations of other devices in communication with the home gateway are minimally disrupted. For example, if there are two client devices 150 that are already receiving content via a MoCA connection with the home gateway 160, then the home gateway may choose to use a WiFi link to provide content to a third client device 150 that may be requesting content.

At block 735, the content may be transmitted to the client device via the selected link. In example embodiments, the home gateway may emulate an IP content source for the client device 150. In other words, in some example embodiments, the home gateway 160 may receive the content in a non-streaming format, trans-encode the content as streaming content, provide a playlist to the client device 150, if necessary, and stream the content to the client device 150.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A system, comprising:
at least one memory storing computer-executable instructions; and
at least one processor, wherein the at least one processor is configured to access the at least one memory and to execute the computer executable instructions to:
identify a request for content from a client device, wherein the request is for a first signal type of the content;
determine that the content is available at a first source and a second source;
determine to load balance between the first source and the second source, wherein the first signal type is associated with the first source of the content and a second signal type is associated with the second source of the content;
identify at least one first metric associated with a first pathway to the first source, wherein:
the at least one first metric comprises a first latency associated with the first pathway;
identify at least one second metric associated with a second pathway to the second source, wherein:
the at least one second metric comprises a second latency associated with the second pathway;
identify at least one third metric associated with a third pathway with the client device;
load balance, based at least in part on the at least one first metric, the at least one second metric, and the at least one third metric, wherein to load balance includes to cause the content to be provided to the client device from the second source; and
transcode the content from the second signal type to the first signal type.

2. The system of claim 1, wherein the first source is an IP source and the second source is a QAM content source.

3. The system of claim 1, wherein the at least one processor is further configured to execute the computer-executable instructions to transmit an indication to the client device that the content is to be provided from the first source.

4. The system of claim 1, wherein, to transcode the content from the second signal type to the first signal type, the at least one processor is further configured to execute the computer-executable instructions to:
receive the content from a QAM content source;
trans-encapsulate the content from the QAM content source as IP-based content; and
transmit the IP-based content to the client device.

5. A method, comprising:
identifying, by a home gateway device comprising one or more computer processors, a request for content from a client device, wherein the request is for a first signal type of the content;
determining, by the home gateway device, that the content is available at a first source and a second source;
determining to load balance between the first source and the second source, wherein the first signal type is associated with the first source of the content and a second signal type is associated with the second source of the content;
identifying, by the home gateway device, at least one first metric associated with a first pathway to the first source, wherein:
the at least one first metric comprises a first latency between the first source and the home gateway device;
identifying, by the home gateway device, at least one second metric associated with a pathway to the second source, wherein:

the at least one second metric comprises a second latency between the second source and the home gateway device;

identifying, by the home gateway device, at least one third metric associated with a third pathway to the client device;

load balancing, by the home gateway device and based at least in part on the at least one first metric, the at least one second metric, and the at least one third metric, wherein to load balance includes to cause the content to be provided to the client device from the second source; and transcoding the content from the second signal type to the first signal type.

6. The method of claim 5, further comprising transmitting, by the home gateway device, an indication to the client device that the content is to be provided from the first source.

7. The method of claim 5, wherein transcoding the content from the second signal type to the first signal type further comprises:

receiving, by the home gateway device, the content from a QAM content source;

trans-encapsulating, by the home gateway device, the content from the QAM content source as an IP-based content; and transmitting, by the home gateway device, the IP-based content to the client device.

8. The method of claim 5, wherein:

the request for content includes an identifier of the content, and determining that the content is available at a first source and a second source comprises:

providing the identifier to the first source, in response to querying the content and providing the identifier to the second source, in response to querying the content.

9. The method of claim 5, wherein the at least one first metric includes available bandwidth between the first source and the home gateway, and wherein the at least one second metric includes available bandwidth between the second source and the home gateway.

10. A system, comprising:

at least one memory storing computer-executable instructions; and at least one processor, wherein the at least one processor is configured to access the at least one memory and to execute the computer executable instructions to:

identify a request for content from a client device, wherein the request is for a first signal type of the content;

identify at least one first metric associated with a first pathway between the client device and a network, wherein:

the at least one first metric comprises a first latency associated with the first pathway;

identify at least one second metric associated with a second pathway between the client device and the network, wherein:

the at least one second metric comprises a second latency associated with the second pathway;

identify at least one third metric associated with a third pathway between the client device and the network, wherein the at least one third metric comprises a third latency associated with the third pathway;

determine to load balance between the first pathway, the second pathway, and the third pathway, wherein the first pathway is associated with the first signal type of the content and the second pathway is associated with a second signal type of the content; and load balance, based at least in part on the at least one first metric, the at least one second metric, and the at least one third metric, wherein to load balance includes to cause the content to be provided to the client device via the second pathway; and transcode the content from the second signal type to the first signal type.

11. The system of claim 10, wherein to identify a request for content from the client device comprises intercepting the request for content.

12. The system of claim 10, wherein the at least one first metric includes available bandwidth via the first pathway, the at least one second metric includes available bandwidth via the second pathway, and the at least one third metric includes available bandwidth via the third pathway.

13. The system of claim 10, wherein the second pathway is one of: (i) a multimedia over cable (MoCA) connection, (ii) an Ethernet connection, or (iii) a WiFi connection.

14. The system of claim 10, wherein to determine that the content is to be provided to the client device via the second pathway comprises:

determining that a first available bandwidth associated with the second pathway is greater than both (i) a second available bandwidth associated with the first pathway, and (ii) a third available bandwidth associated with the third pathway.

15. The system of claim 10, wherein to identify the at least one first metric associated with the first pathway between the client device and the network comprises identifying the at least one first metric based at least in part on the request for content.

16. A method, comprising:

identifying, by a gateway device comprising one or more computer processors, a request for content from a client device, wherein the request is for a first signal type of the content;

identifying, by the gateway device, at least one first metric associated with a first pathway between the client device and a network, wherein:

the at least one first metric comprises a first latency associated with the first pathway;

identifying, by the gateway device, at least one second metric associated with a second pathway between the client device and the network, wherein:

the at least one second metric comprises a second latency associated with the second pathway;

identifying, by the gateway device, at least one third metric associated with a third pathway with the client device, wherein the at least one third metric comprises a third latency associated with the third pathway;

determining to load balance between the first pathway, the second pathway, and the third pathway, wherein the first pathway is associated with the first signal type of the content and the second pathway is associated with a second signal type of the content;

load balancing, by the gateway device and based at least in part on the at least one first metric, the at least one second metric, and the at least one third metric, wherein to load balance includes to cause the content to be provided to the client device via the second pathway; and transcoding the content from the second signal type into the first signal type.

17. The method of claim 16, wherein identifying a request for content from the client device comprises intercepting the request for content.

18. The method of claim 16, wherein the at least one first metric includes available bandwidth via the first pathway, the at least one second metric includes available bandwidth via the second pathway, and the at least one third metric includes available bandwidth via the third pathway.

19. The method of claim 16, wherein the second pathway is one of: (i) a multimedia over cable (MoCA) connection, (ii) an Ethernet connection, or (iii) a WiFi connection.

20. The method of claim 16, wherein determining that the content is to be provided to the client device via the second pathway comprises determining that a second available bandwidth associated with the second pathway is greater than both (i) a first available bandwidth associated with the first pathway, and (ii) a third available bandwidth associated with the third pathway.

21. The method of claim 16, wherein transcoding the content from the second signal type to the first signal type further comprises:
- receiving, by the gateway device, the content as a quadrature amplitude modulation (QAM) signal;
- trans-encoding, by the gateway device, the received content from a QAM signal to an internet protocol (IP) streaming signal; and
- transmitting, by the gateway device, the IP streaming signal to the client device.

* * * * *